Nov. 3, 1959  A. BAILEY, JR., ET AL  2,911,019
POWER-OPERATED DISC CUTTER ATTACHMENT FOR DRILL PRESSES
Filed Aug. 19, 1957
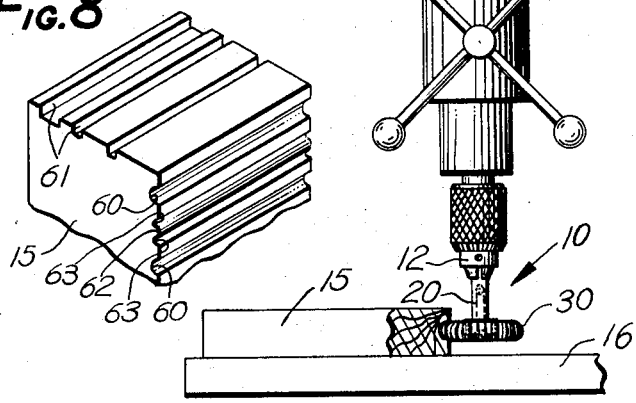
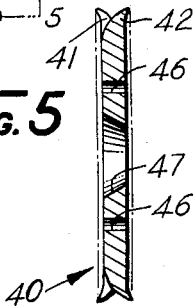
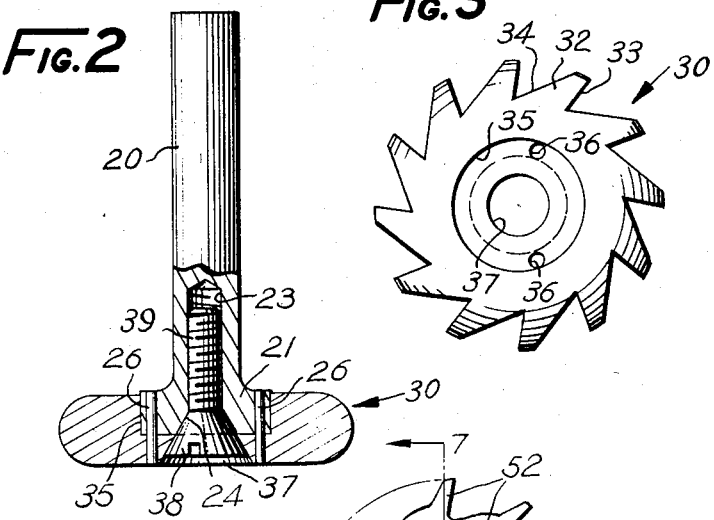
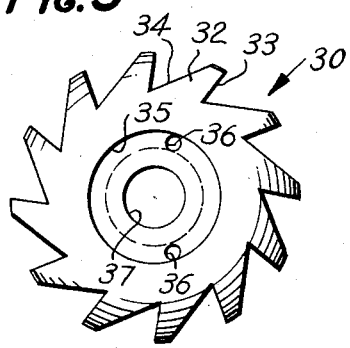
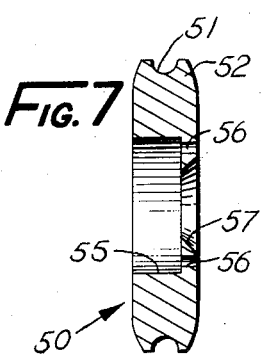
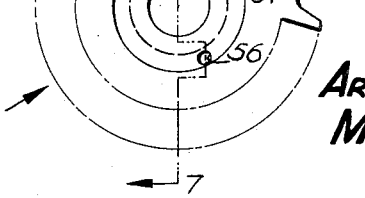
INVENTORS.
ARCHIBALD BAILEY JR.
MARGARET BAILEY

United States Patent Office 2,911,019
Patented Nov. 3, 1959

2,911,019

POWER-OPERATED DISC CUTTER ATTACHMENT FOR DRILL PRESSES

Archibald Bailey, Jr., and Margaret Bailey, Los Angeles, Calif., assignors of one-tenth to Gadget-Of-The-Month Club, Inc., Los Angeles, Calif., a corporation of California Application August 19, 1957, Serial No. 678,801

6 Claims. (Cl. 144—136)

This invention relates to cutting tools and more particularly to a cutting tool attachment for drill presses.

It is an object of the present invention to provide an attachment for drill presses having interchangeable cutting means for producing molding of various sizes, shapes, and designs on wood or other soft material in a simple and efficient manner.

Another object of the present invention is to provide an attachment for drill presses of the above type having a plurality of interchangeable cutter blades for producing various types of designs in moldings and finished articles and which includes novel coupling means for facilitating the mounting of any one of a plurality of different sizes and shapes of cutters.

Other objects of the invention are to provide a cutting attachment for drill presses bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view, with parts broken away, of an attachment for drill presses made in accordance with the present invention and shown in operative use;

Figure 2 is an enlarged side elevational view, shown partly in section, illustrating a cutting attachment made in accordance with one form of the present invention;

Figure 3 is an enlarged top plan view of the cutter blade shown in Figure 2 but with the adapter shaft removed;

Figure 4 is a fragmentary top elevational view similar to Figure 3, showing a modified form of cutter;

Figure 5 is a transverse cross sectional view taken along line 5—5 of Figure 4;

Figure 6 is a view similar to Figure 4, showing a still further modified form of cutter;

Figure 7 is a transverse cross sectional view taken along line 7—7 of Figure 6; and Figure 8 is a fragmentary perspective view of a wood workpiece manufactured by a device made in accordance with the present invention.

Referring now more in detail to the drawing, a cutting tool attachment indicated generally at 10 for drill presses is shown in operative secured engagement within the conventional chuck 12 of a conventional vertically adjustable drill press 13. The tool, in Figure 1, is shown in cutting engagement with a workpiece 15 of wood or other fibrous or plastic material that is secured in suitable manner (not shown) upon the work bench 16 of the drill press.

As is more clearly shown in Figure 2, the cutting tool attachment 10 is shown to include an adapter shaft or spindle 20 that is of substantially cylindrical shape and is provided with an enlarged circular head portion 21 at one end. The head end of the shaft is provided with a longitudinally extending threaded bore 23 having an enlarged inwardly tapered countersunk bore 24 for threadingly receiving the cutting tool attachment bolt or machine screw 39, in a manner hereinafter described. The head portion 21 is also provided with a plurality of longitudinally outwardly extending positioning pins 26 which are irregularly spaced apart and parallel to the longitudinal axis of the adapter shaft 20 for positioning the cutter upon the head portion 21.

A cutter 30 made in accordance with one form of the present invention is shown in Figures 1 to 3 to include a circular main body portion having a plurality of teeth 32 of segmental circular cross section. Each tooth 32 is provided with a radially outwardly extending cutting face 33 and a tangentially disposed trailing surface 34. The main body portion is also provided with a centrally located circular recess 35 for receiving the head portion 21 of the adapter shaft. A plurality of longitudinally extending, irregularly spaced apart bores 36 also extend through the recessed portion of the main body of the cutter 30 for slidably receiving the positioning pins 26 that are pressfitted in secured engagement with the head portion 21 of the shaft. As is more clearly shown in Figure 2, the cutter 30 is also provided with an inwardly tapering countersink bore 37 that is concentric with the recess 35 for receiving the head 38 of the attachment bolt or machine screw 39 that secures the cutter to the shaft.

In Figures 4 and 5, a modified form of cutter 40 is shown to have a plurality of peripheral triangular teeth 41, 42, alternately inclined toward opposite sides of the central plane of the cutter. Each cutting tooth 41, 42, is provided with a cutting face 43 and a trailing face 44 which defines substantially equal angles with tangents of the circular cutter 40. The main body portion of the cutter is also provided with a plurality of irregularly spaced apart bores 46 for receiving the positioning pins 26 in a manner hereinbefore described, and a countersunk bore 47 for recessing the head 38 of the bolt or machine screw 39 below the outer surface thereof when secured in place.

In Figures 6 and 7, a still further modified form of cutter 50 is shown in which the peripheral teeth 52 define concave recesses 50 adjacent to the periphery thereof. Each tooth is also provided with a radially disposed cutting face 53 and a tangentially disposed trailing face 54. The central portion of the cutter also is provided with a recess 55 for receiving the head 21 of the shaft, as well as bores 56 for receiving the positioning pins 26 and a countersunk bore 57 for recessing the head 38 of the attachment bolt 39 when the parts are in operative position.

It will be readily recognized that any one of the aforementioned cutting heads 30, 40, 50 may be used in connection with the universal adapter shaft 20 that is conventionally secured within the chuck 12 of the drill press. With reference to Figure 8, it will be noted that the cutting tool 30 having a convex cutting surface may be used to provide longitudinal recesses 60 in the workpiece 15, while the cutting head 40 may be used to provide shallow grooves 61 of substantially rectangular cross sectional configuration. The cutting head 40 may also be used to plane or surface the workpiece 15. In a similar manner, the cutting head 50 having the concave cutting edge may be used to provide ribs 62 and adjacent grooves 63 along any desired surface of a workpiece. In view of the ultimate simplicity in attaching the various cutting heads of the adapter shaft, it is a simple matter to exchange cutting heads as may be desired during the production of any single unit, while it is also a simple matter to replace any worn or broken cutting tools without necessitating the replacement of the adapter shaft that may be permanently secured to the drill press throughout the entire cutting procedures. Thus there is provided a very versatile and practical tool.

While various changes may be made in the detail construction, it shall be understood that such changes shall be within the spirit and scope of the present invention as defined by the appended claims.

What we claim as new and desire to protect by Letters Patent of the United States is:

1. An attachment for drill presses comprising, in combination, an adapter shaft and a cutting tool, said adapter shaft including a main body portion having an enlarged head at one end, said cutting tool having a circular main body portion provided with a central bore, positioning pins secured to said enlarged head outwardly of said cutting tool bore and extending parallel to the longitudinal axis of said shaft, said cutting tool having irregularly spaced apart bores for slidably receiving said positioning pins, and securement means extending through said cutting tool bore for detachably securing said cutting tool to said shaft.

2. The combination according to claim 1, wherein said main body portion of said cutting tool defines a recess of larger diameter than said bore and concentric therewith for receiving said enlarged head of said adapter shaft.

3. The combination according to claim 2, wherein said cutting tool comprises a plurality of circumferentially spaced apart cutter portions of substantially convex cross sectional configuration.

4. The combination according to claim 1, wherein said cutting tool comprises a plurality of circumferentially spaced apart cutting teeth alternately inclined toward opposite sides of the central plane of said cutting tool.

5. The combination according to claim 2, wherein said cutting tool comprises a plurality of circumferentially spaced apart cutter portions of substantially concave cross sectional configuration.

6. The combination according to claim 2, said securement means comprising said adapter shaft and head having an inwardly extending, internally threaded bore, said head having a first frusto-conical bore communicating with said internally threaded bore, said cutting tool main body having a second frusto-conical bore concentric with and adapted to be aligned with said first frusto-conical bore to form a unitary frusto-conical bore, and screw means including an externally threaded shank adapted to be screwed into said internally threaded bore and an enlarged frusto-conical head adapted to be received within said unitary frusto-conical bore, with the outer end of said screw head displaced inwardly from the outer surface of said cutting tool main body.

References Cited in the file of this patent

UNITED STATES PATENTS

| | | |
|---|---|---|
| 692,028 | Page | Jan. 28, 1902 |
| 746,958 | Headley | Dec. 15, 1903 |
| 2,587,994 | Gregory | Mar. 4, 1952 |
| 2,823,713 | Goldsmith | Feb. 18, 1958 |

FOREIGN PATENTS

| | | |
|---|---|---|
| 765,292 | Great Britain | Jan. 9, 1957 |